US007421206B2

United States Patent
Lee et al.

(10) Patent No.: US 7,421,206 B2
(45) Date of Patent: Sep. 2, 2008

(54) OPTICAL TRANSCEIVER FOR TRANSMITTING LIGHT SOURCE CONTROL INFORMATION AND OPTICAL NETWORK USING THE SAME

(75) Inventors: Chul Soo Lee, Daejeon (KR); Byoung Whi Kim, Daejeon (KR); Eui Suk Jung, Daejeon (KR); Seung Hyun Jang, Jeju (KR)

(73) Assignee: Electronics and Telecommunications Research Institute (KR)

( * ) Notice: Subject to any disclaimer, the term of this patent is extended or adjusted under 35 U.S.C. 154(b) by 662 days.

(21) Appl. No.: 11/126,591

(22) Filed: May 10, 2005

(65) Prior Publication Data

US 2006/0120727 A1     Jun. 8, 2006

(30) Foreign Application Priority Data

Dec. 7, 2004     (KR)     ...................... 10-2004-0102607

(51) Int. Cl.
*H04J 14/02*     (2006.01)
*H04B 10/24*     (2006.01)

(52) U.S. Cl. ........................................ 398/136; 398/83

(58) Field of Classification Search .................. 398/83, 398/136, 158–159, 195, 198
See application file for complete search history.

(56) References Cited

U.S. PATENT DOCUMENTS 5,796,503 A * 8/1998 Junginger et al. ........ 398/167.5
5,798,858 A * 8/1998 Bodeep et al. ............. 398/194
6,271,942 B1 * 8/2001 Sasai et al. ..................... 398/9

FOREIGN PATENT DOCUMENTS

| KR | 1020040089910 | 10/2004 |
|----|---------------|---------|
| KR | 10-2005-0028987 | 3/2005 |

OTHER PUBLICATIONS

"Optical Beat Noise Suppression and Power Equalization in Subcarrier Multiple Access Passive Optical Networks by Downstream Feedback", S. Soerensen, Journal of Lightwave Technology, vol. 18, No. 10, Oct. 2000, IEEE.

* cited by examiner

*Primary Examiner*—Leslie Pascal
(74) *Attorney, Agent, or Firm*—Blakely, Sokoloff, Taylor & Zafman

(57) ABSTRACT

An optical transceiver for transmitting light source control information, which is applied to a Subcarrier Multiplexing optical network, is disclosed. The optical transceiver includes a controller, an SCM frame generation/restoring unit, a modulator/demodulator, and an EO/OE converter. The controller controls transmission of light source control information or collects received light source control information. The SCM frame generation/restoring unit generates an SCM frame containing light source control information received from the controller. The modulator/demodulator modulates an SCM frame generated by the SCM frame generation/restoring unit into a signal suitable for transmission. The EO/OE converter converts a transmission signal modulated by the modulator/demodulator into an optical signal and transmits the optical signal through an optical fiber. An optical network having a telephone office OLT and subscriber ONTs, each having the optical transceiver, is also disclosed.

7 Claims, 5 Drawing Sheets

OPTICAL TRANSCEIVER FOR TRANSMITTING LIGHT SOURCE CONTROL INFORMATION AND OPTICAL NETWORK USING THE SAME

RELATED APPLICATION

The present application is based on, and claims priority from, Korean Application Number 2004-102607, filed Dec. 07, 2004, the disclosure of which is incorporated by reference herein in its entirety.

BACKGROUND OF THE INVENTION

1. Field of the Invention

The present invention relates to an optical transceiver that is applied to an optical network such as a Passive Optical Network (PON) and a Subcarrier Multiplexing over Wavelength Division Multiplexing (WDM) PON, and more particularly to an optical transceiver for transmitting light source control information and an optical network using the same, which are implemented so as to allow an Optical Network Terminal (ONT) at the subscriber side (hereinafter referred to as a "subscriber ONT") and/or an Optical Line Terminal (OLT) at the communication company side (hereinafter referred to as a "telephone office OLT") to transmit light source control information by incorporating it into an SCM frame, which is a physical layer transport frame, in an SCM optical network, so that information of Optical Beat Interference (OBI) on a communication link can be transmitted in real time in the optical network such as a PON, thereby making it possible to manage and control a light source causing OBI.

2. Description of the Related Art

The most important factor in development of optical network technology is development of a transmission technique that is cost-effective and supports mass production, taking into consideration characteristics of a subscriber access network. To accomplish this, it is necessary to reduce the price of optical parts and also to provide a technique for accommodating a large number of subscribers. One method of implementing such an economical optical communication system is to allow a large number of subscribers to share wavelengths and increase the number of subscribers, given a set band of wavelengths.

One method of increasing the number of subscribers is a Subcarrier Multiplexing technique, in which light sources of subscribers with different subcarriers share a wavelength. In this technique, a subscriber incorporates its information into a subcarrier assigned to the subscriber to transmit the information, and the receiving side uses a band pass filter corresponding to the subscriber to pass a signal received from the subscriber to extract the information of the subscriber.

One conventional SCM optical communication system is described below with reference to FIG. 1.

FIG. 1 is a schematic block diagram of the conventional SCM optical communication system.

As shown in FIG. 1, the conventional SCM optical communication system comprises a plurality of subscriber ONTs 10-1 to 10-N including a plurality of optical transceivers 11-1 to 11-N for transmitting a plurality of optical signals, respectively, through a single wavelength, an optical coupler 20 for coupling the optical signals, transmitted from the optical transceivers 11-1 to 11-N of the subscriber ONTs 10-1 to 10-N, to a single optical fiber, and a telephone office OLT 30 having an optical transceiver 31 for receiving an optical signal output from the optical coupler.

In the conventional optical communication system shown in FIG. 1, the same wavelength is used for transmission from the subscriber ONTs 10-1 to 10-N to the optical coupler 20, but information of the subscriber ONTs 10-1 to 10-N is carried on different subcarriers $\lambda_{1,1}$ to $\lambda_{1,n}$. In this manner, the SCM technique allows a plurality of subscribers to share a single wavelength, lowering network implementation costs. Thus, the SCM technique makes it possible to implement a low-cost optical network.

FIG. 2 is a block diagram of one of the conventional optical transceivers shown in FIG. 1.

The optical transceiver shown in FIG. 2 comprises an electrical-to-optical/optical-to-electrical (EO/OE) converter for electro-optically converting an electrical signal for transmission into an optical signal and providing the optical signal to an optical fiber, and photoelectrically converting an optical signal received through the optical fiber into an electric signal.

As is known in the art, in an SCM-based optical network, optical beat interference (OBI) occurs if an optical transceiver located at a telephone office OLT simultaneously receives at least two optical signals from subscriber ONTs. The central frequency of OBI noise corresponds to the difference between the central frequencies of two received optical signals, and the spectrum of the OBI noise has a form similar to that of the convolution of the spectrums of the two optical signals.

The frequency of the OBI noise may be present in a band of subcarrier signals in the photoelectric conversion procedure so that the OBI noise is a major factor decreasing the signal to noise ratio of electrical signals produced by the photoelectric conversion. Thus, there is a need to perform appropriate measurement, transmission and control of the OBI noise.

In other words, if a frequency corresponding to the difference between the central frequencies of two received optical signals is present in the band of subcarrier signals, OBI occurs in the band of subcarrier signals, and the OBI serves as noise, reducing the signal to noise ratio. Thus, it is necessary for the SCM based optical network to reduce the OBI noise. As another example, if an optical receiver receives two optical signals that have the same optical spectrum and have nearly the same central frequency, the optical receiver has an electrical spectrum as shown in FIG. 3.

FIG. 3 shows a received signal spectrum for illustrating OBI noise occurring in the conventional optical transceiver. In FIG. 3, if the width $\Delta\lambda$ of the total wavelength range is near zero, i.e., if the two optical signals have nearly the same central frequency, the central frequency of the OBI noise is near zero as can be seen from the received signal spectrum of FIG. 3. This is because OBI noise occurs at a frequency corresponding to the difference between the central frequencies of the optical signals. If the optical signals have a narrow spectrum, substantial OBI occurs in the narrow frequency band about a frequency of zero so that the OBI serves as a major source of noise in the subcarrier band.

One conventional method of reducing OBI noise is described in, "Optical Beat Noise Suppression and Power Equalization in Sub Carrier Multiple Access Passive Optical Networks by Downstream Feedback" (Journal of Lightwave Technology, Vol. 18, No. 10 October 2000, p 1337-p 1347). In this method, a band other than frequencies used to modulate optical signals is selected, and only the selected band is passed through a filter to measure noise. A Central Processing Unit (CPU) of an OLT transmits light source control information through an electrical monitoring channel to control the wavelength of a light source causing OBI.

Another conventional method of reducing OBI noise uses a light source, into which a temperature control module and a laser diode are packaged. In this method, the temperature of laser diodes of different light sources is controlled to separate the central frequencies of the different light sources far apart from each other so that OBI occurs at a frequency above the subcarrier band.

However, the conventional OBI reduction methods reduce OBI by directly controlling the light source or using a device for controlling the light source. Since OBI occurs at the optical transceiver of the telephone office OLT and the OBI is controlled in the subscriber ONT, the conventional OBI reduction methods have the following problems. In order for the telephone office OLT to monitor and control OBI of a subscriber ONT in the SCM optical network, the subscriber ONT must transmit its light source information to the telephone office OLT, and the telephone office OLT must transmit light source control information required to control the light source of the subscriber ONT to the subscriber ONT through a separate communication path.

After detecting the occurrence of OBI, the OLT must quickly transfer light source control information required to control the light source of the ONT to the ONT through a communication path established between the OLT and the ONT. In addition, both the OLT and the ONT need to have a function to control the light source of the ONT without changing the existing commercial communication architecture or the existing user interface.

SUMMARY OF THE INVENTION

Therefore, the present invention has been made in view of the above problems, and it is an object of the present invention to provide an optical transceiver for transmitting light source control information and an optical network using the same, which are implemented so as to allow a subscriber ONT and/or a telephone office OLT to transmit light source control information by incorporating it into a Subcarrier Multiplexing frame, which is a physical layer transport frame, in an SCM optical network such as an SCM Passive Optical Network (PON) and an SCM Wavelength Division Multiplexing (WDM) PON (WPON), so that information of Optical Beat Interference (OBI) on a communication link can be transmitted in real time in the optical network such as a PON, thereby making it possible to manage and control a light source causing OBI.

In accordance with one aspect of the present invention, the above and other objects can be accomplished by the provision of an optical transceiver for transmitting light source control information, the optical transceiver being applied to a telephone office OLT and a subscriber ONT in an optical network, the transceiver comprising: a controller for controlling transmission of light source control information used for Optical Beat Interference (OBI) control, and collecting received light source control information to perform light source control; an SCM frame generation/restoring unit for generating an SCM frame containing light source control information received from the controller, and restoring a received SCM frame to original data by extracting light source control information from the received SCM frame and transferring the extracted information to the controller; a modulator/demodulator for modulating an SCM frame generated by the SCM frame generation/restoring unit into a signal suitable for transmission, and demodulating a received signal into an SCM frame and transferring the SCM frame to the SCM frame generation/restoring unit; and an EO/OE converter for converting a transmission signal modulated by the modulator/demodulator into an optical signal and transmitting the optical signal through an optical fiber, and converting an optical signal received through the optical fiber into an electrical signal and transferring the electrical signal to the modulator/demodulator.

In accordance with another aspect of the present invention, there is provided an optical network having a subscriber ONT and a telephone office OLT, each of which has the optical transceiver described above.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
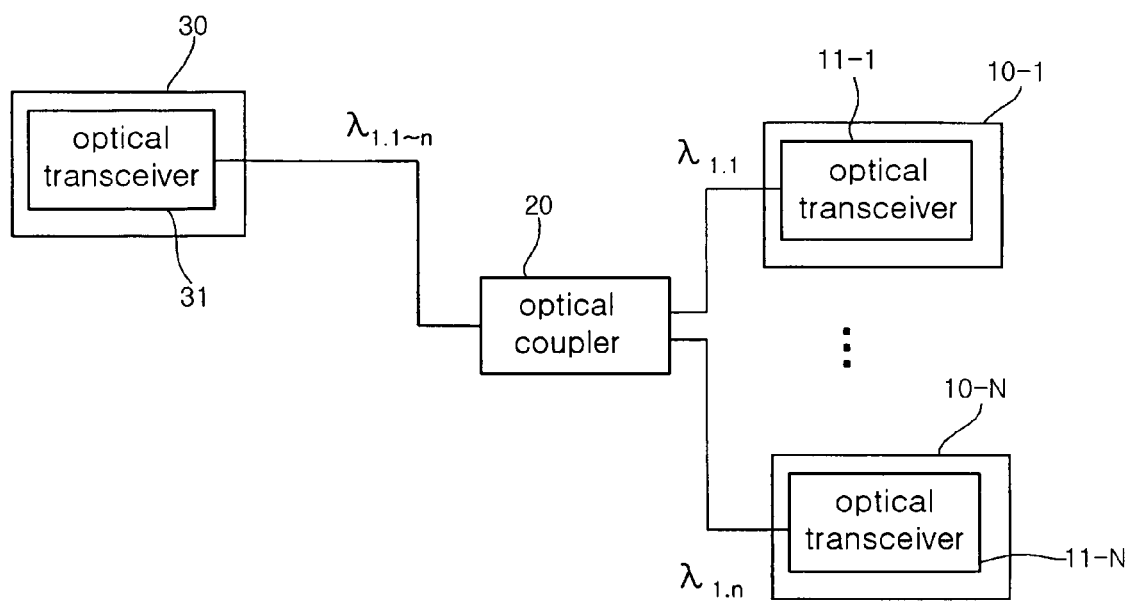
FIG. 1 is a schematic block diagram of a conventional SCM optical communication system.
Figure 2:
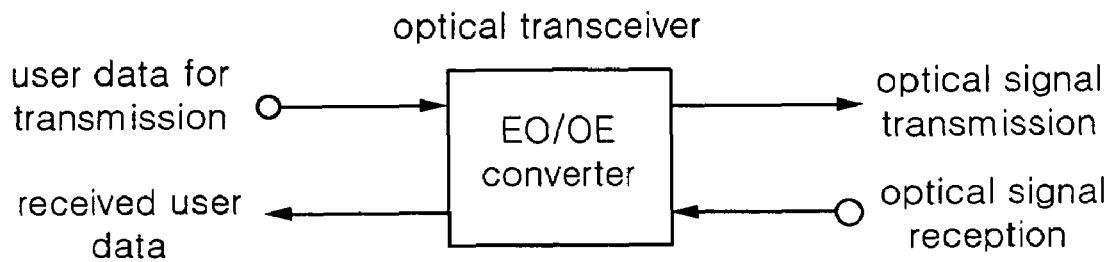
FIG. 2 is a block diagram of a conventional optical transceiver.
Figure 3:
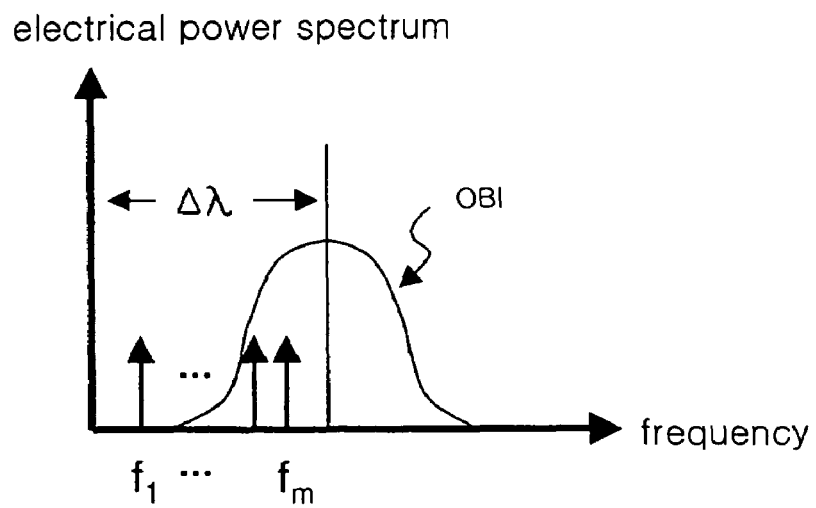
FIG. 3 is a graph showing a received signal spectrum for illustrating OBI noise occurring in the conventional optical transceiver.

Now, preferred embodiments of the present invention will be described with reference to the accompanying drawings. In the drawings, the same or similar elements are denoted by the same reference numerals even though they are depicted in different drawings.

Figure 4:
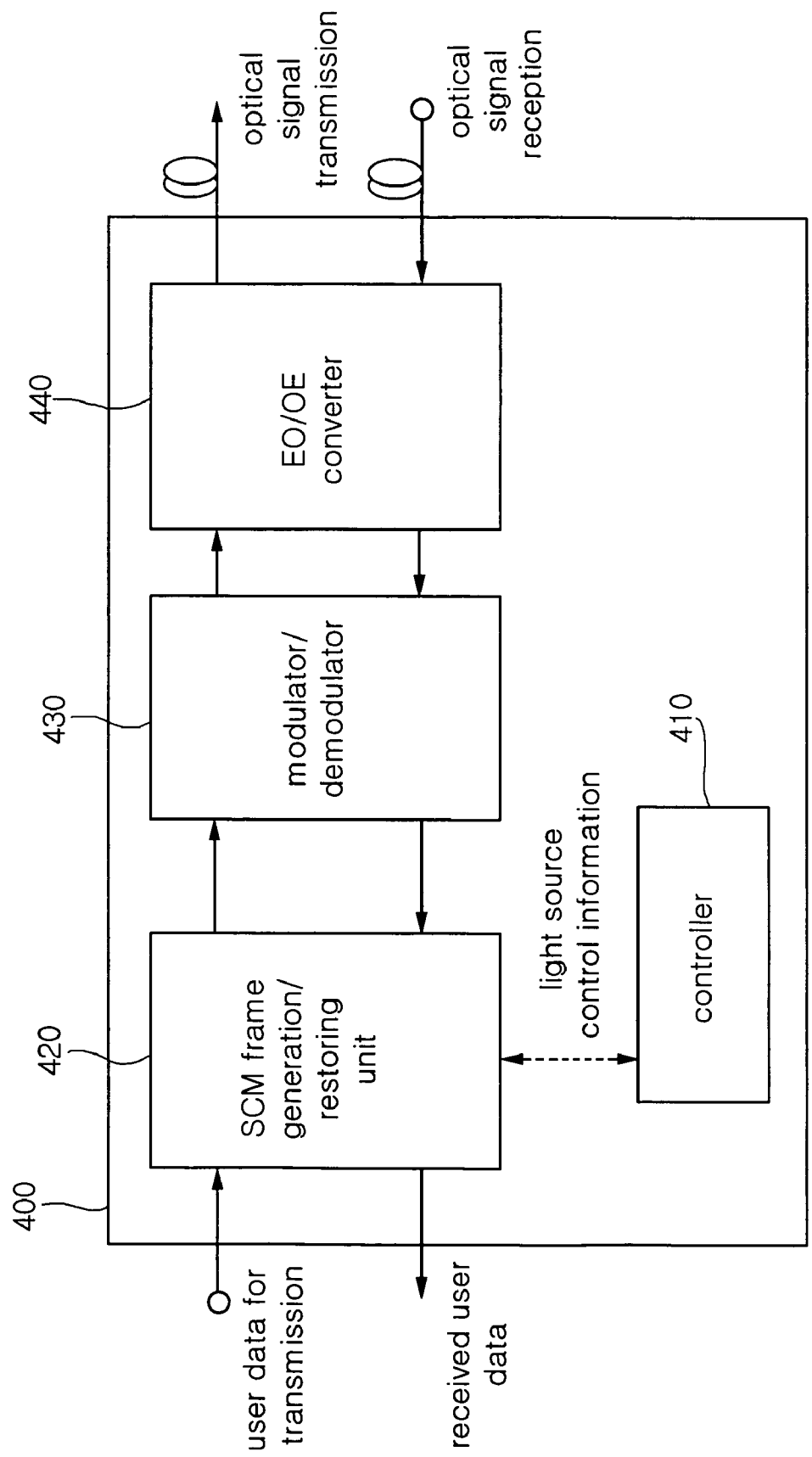
FIG. 4 is a block diagram of an optical transceiver according to the present invention.

FIG. 4 is a block diagram of an optical transceiver according to the present invention.

The optical transceiver according to the present invention is applied to a telephone office OLT and a subscriber ONT. As shown in FIG. 4, the optical transceiver 400 includes a controller 410, an SCM frame generation/restoring unit 420, a modulator/demodulator 430, and an EO/OE converter 440. The controller 410 controls transmission of light source control information used for Optical Beat Interference (OBI) control, and collects received light source control information to perform light source control. The SCM frame generation/restoring unit 420 generates an SCM frame (SCM-FM) containing light source control information received from the controller 410. When restoring a received SCM frame to original data, the SCM frame generation/restoring unit 420 extracts light source control information from the received SCM frame and transfers the extracted information to the controller 410. The modulator/demodulator 430 modulates an SCM frame generated by the SCM frame generation/restoring unit 420 into a signal suitable for transmission. Also, the modulator/demodulator 430 demodulates a received signal into an SCM frame, and transfers the SCM frame to the SCM frame generation/restoring unit 420. The EO/OE converter 440 converts a transmission signal modulated by the modulator/demodulator 430 into an optical signal, and transmits the optical signal through an optical fiber. The EO/OE converter 440 converts an optical signal received through the optical fiber into an electrical signal, and transfers the electrical signal to the modulator/demodulator 430.

The modulator/demodulator 430 performs a digital modulation procedure in which it converts data for transmission into an analog signal through a modulation scheme such as QAM, and an SCM multiplexing procedure in which it loads the analog signal on a subcarrier to transmit it.

Figure 5:
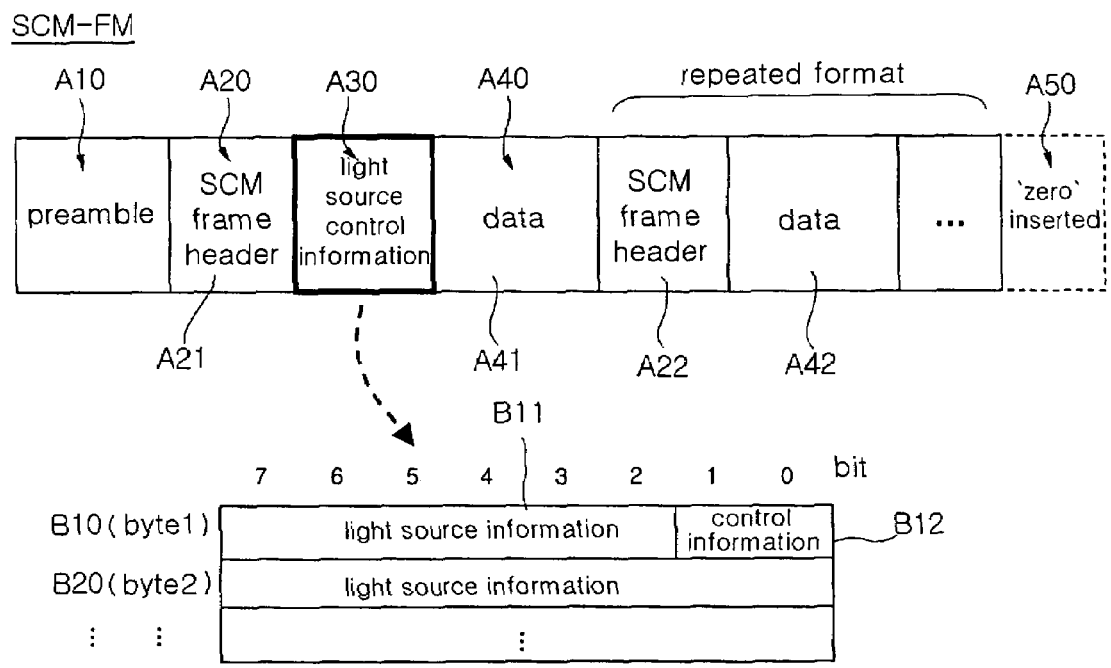
FIG. 5 is a diagram illustrating the structure of an SCM frame according to the present invention.

FIG. 5 is a diagram illustrating the structure of an SCM frame according to the present invention.

As shown in FIG. 5, the SCM frame includes a preamble area A10, which contains start information of the SCM frame, an SCM frame header area A20, which contains an indication of whether or not OBI information is present, length information of the OBI information, and SCM frame generation information of data, and a light source control information area A30, which contains light source control information.

Alternatively, the SCM frame may include a preamble area 10, which contains start information of the SCM frame, one or more SCM frame header areas A20, which contain an indication of whether or not OBI information is present, length information of the OBI information, and SCM frame generation information of data, a light source control information area A30, which contains light source control information, and a null area A50 in which zeros "0" are inserted to adjust the length of the SCM frame.

The light source control information area A30 includes a plurality of bytes B10, B20, . . . containing light source control information. The first byte B10 contains light source information B11 and control information B12. The control information B12 is ONT source/destination information of the light source information B11, which indicates whether the ONT is the source or destination of the light source information B11. The light source information B11 includes light source wavelength, temperature, and power information.

The light source information of the light source control information area A30 may be telephone office light source control information to be transmitted from a telephone office OLT to a subscriber ONT to control a light source of the subscriber ONT.

The light source information of the light source control information area A30 may also be subscriber light source information to be transmitted from a subscriber ONT to a telephone office OLT, which contains information about a light source of the subscriber ONT.

Figure 6:
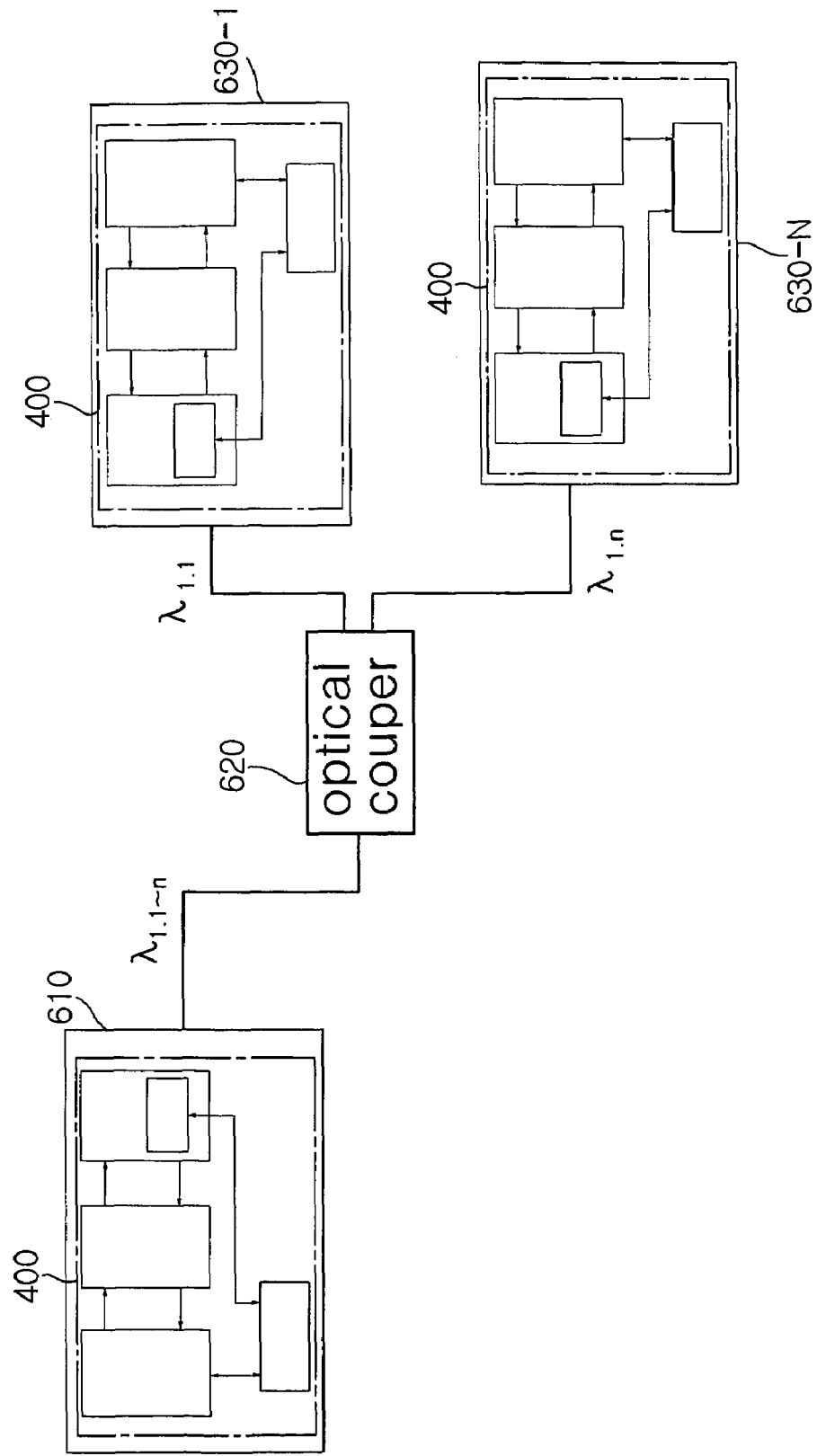
FIG. 6 is a block diagram of an example optical network implemented using an optical transceiver according to the present invention.

FIG. 6 is a block diagram of an example optical network implemented using an optical transceiver according to the present invention.

As shown in FIG. 6, the optical network according to the present invention includes a telephone office OLT 610, an optical coupler 620 connected with the telephone office OLT 610 through a single optical fiber, and a plurality of subscriber ONTs 630-1 to 630-N connected with the optical coupler 620 through respective optical fibers.

Each of the telephone office OLT 610 and the subscriber ONTs 630-1 to 630-N includes an optical transceiver 400 as shown in FIG. 4.

When the optical transceiver 400 shown in FIG. 4 is applied to the telephone office OLT, the light source information of the area light source control information A30 is telephone office light source control information to be transmitted from the telephone office OLT to a subscriber ONT to control a light source of the subscriber ONT as described above.

When the optical transceiver 400 shown in FIG. 4 is applied to a subscriber ONT, the light source information of the light source control information area A30 is subscriber light source information to be transmitted from the subscriber ONT to the telephone office OLT, which contains information about a light source of the subscriber ONT, as described above.

The operation and advantages of the present invention will now be described in detail with reference to the drawings.

The optical transceiver according to the present invention is applied to a telephone office OLT and a subscriber ONT in a communication network such as a passive optical network so that the telephone office OLT and/or the subscriber ONT can insert light source control information into an SCM frame and transmit it to each other. The optical transceiver according to the present invention applied to each of the telephone office OLT and the subscriber ONT will now be described in detail with reference to FIGS. 4 to 6.

In the following, an SCM frame transmission procedure and an SCM frame reception procedure of the optical transceiver 400 according to the present invention will be described with reference to FIGS. 4 to 6.

First, a description will be given of how the optical transceiver 400 according to the present invention performs the SCM frame transmission procedure.

The controller 410 of the optical transceiver 400 according to the present invention transfers light source control information for OBI control to the SCM frame generation/restoring unit 420 and controls SCM frame transmission.

The SCM frame generation/restoring unit 420 of the optical transceiver 400 generates an SCM frame (SCM-FM) containing user data and the light source control information received from the controller 410, and transfers the generated SCM frame to the modulator/demodulator 430. The SCM frame generation/restoring unit 420 generates a fixed-size SCM frame corresponding to variable-size user transmission data input to the SCM frame generation/restoring unit 420 so that digital demodulation, and error detection and correction function can be performed. In this SCM frame generation procedure, light source control information from the controller 410 is inserted into the SCM frame.

As shown in FIG. 5, the SCM frame (SCM-FM) may include a preamble area A10, which contains start information of the SCM frame, an SCM frame header area A20, which contains an indication of whether or not OBI information is present, length information of the OBI information, and SCM frame generation information of data, and a light source control information area A30, which contains light source control information. This SCM frame is applied when there is a large amount of light source control information. In this case, the light source control information alone can be incorporated into a single SCM frame to be transmitted.

Alternatively, the SCM frame may include a preamble area 10, which contains start information of the SCM frame, one or more SCM frame header areas A20, which contain an indication of whether or not OBI information is present, length information of the OBI information, and SCM frame generation information of data, a light source control information area A30, which contains light source control information, and a null area A50 in which zeros "0" are inserted to adjust the length of the SCM frame. This SCM frame is applied when there is a small amount of light source control information. In this case, user data and light source control information can be incorporated into a single SCM frame to be transmitted.

As an area indicating the start of the SCM frame, the preamble area A10 must have a pattern not appearing in the remaining part of the SCM frame.

The SCM frame header area A20 contains an indication of whether or not OBI information is present, and length information of the OBI information. For example, in the case where an ONT must continually transmit information about a light source of the ONT and the ONT has a large amount of data to be transmitted, light source control information alone can be incorporated into a single SCM frame so that it is transmitted as an independent SCM frame as described above.

The SCM frame header area A20 also contains information used to generate an SCM frame from data of the data area A40. This information is used when the receiver restores the SCM frame to original data or receives OBI information. In addition, a single SCM frame may include a plurality of SCM frame header areas A21 and A22 and a plurality of data areas A41 and A42 as shown in FIG. 5.

Although the light source control information area A30 can be inserted and transmitted in every SCM frame, the area A30 may also not be transmitted if light source control information contained therein is not necessary.

The light source control information area A30 includes a plurality of bytes B10, B20, . . . containing light source control information. The first byte B10 contains light source information B11 and control information B12. The control information B12 is ONT source/destination information of the light source information B11, which indicates whether the ONT is the source or destination of the light source information B11.

For example, in the case where the optical transceiver according to the present invention is applied to a telephone office OLT, the control information B12 may include two bits "10" indicating that the light source information B11 is telephone office light source control information to be transmitted from a telephone office OLT to a subscriber ONT. If light source control information contained in the light source control information area B30 is telephone office light source control information to be transmitted from a telephone office OLT to a subscriber ONT, the light source control information is used to control a light source of the subscriber ONT.

Conversely, in the case where the optical transceiver according to the present invention is applied to a subscriber ONT, the control information B12 may include two bits "01" indicating that the light source information B11 is subscriber light source control information to be transmitted from a subscriber ONT to a telephone office OLT. If light source control information contained in the light source control information area B30 is subscriber light source control information to be transmitted from a subscriber ONT to a telephone office OLT, the light source control information is information about a light source of the subscriber ONT.

Then, the modulator/demodulator 430 in the optical transceiver 400 modulates an SCM frame generated by the SCM frame generation/restoring unit 420 into a signal suitable for transmission. After performing digital modulation on the SCM frame in this manner, the modulator/demodulator 430 loads the modulated SCM frame on an analog subcarrier and transfers it to the EO/OE converter 440. That is, the SCM frame is converted to an analog signal suitable for transmission via digital modulation and digital-to-analog conversion of the modulator/demodulator 430.

The EO/OE converter 440 converts a transmission signal modulated by the modulator/demodulator 430 into an optical signal suitable for transmission via an optical fiber, and transmits the optical signal through the optical fiber.

Next, a description will be given of how the optical transceiver 400 according to the present invention performs the SCM frame reception procedure.

First, the EO/OE converter 440 of the optical transceiver 400 converts an optical signal received through the optical fiber into an electrical signal, and transfers the electrical signal to the modulator/demodulator 430. Although optical signals received by the optical transceiver 400 through the optical fiber have a single wavelength, the optical signals have been modulated with different subcarriers. Thus, the received optical signal is converted to a subcarrier signal.

Then, the modulator/demodulator 430 demodulates a signal received through the EO/OE converter 440 into an SCM frame, and transfers the SCM frame to the SCM frame generation/restoring unit 420. Specifically, the modulator/demodulator 430 removes a subcarrier signal from the signal output from the EO/OE converter 440, and performs digital demodulation on the received signal to obtain an SCM frame, and then transfers the SCM frame to the SCM frame generation/restoring unit 420.

Then, the SCM frame generation/restoring unit 420 restores the SCM frame received from the modulator/demodulator 430 to original data. In this procedure, the SCM frame generation/restoring unit 420 extracts light source control information from the SCM frame and transfers the extracted information to the controller 410. That is, the SCM frame generation/restoring unit 420 restores the data obtained through the digital demodulation to original user data. In this restoring procedure, the SCM frame generation/restoring unit 420 extracts light source control information inserted in the SCM frame, and transfers the extracted information to the controller 410.

Then, the controller 410 collects received light source control information to perform light source control. The controller 410 can control a light source in the EO/OE converter 440 on the basis of the light source control information carried within the received SCM frame.

On the other hand, if the optical transceiver shown in FIG. 4 is applied to each of the telephone office OLT 610 and the plurality of subscribe ONTs 630-1 to 630-N, the telephone office OLT 610 is connected with the plurality of subscriber ONTs 630-1 to 630-N through the optical coupler 620 as shown in FIG. 6.

In the case of FIG. 6, as the optical transceiver 400 operates as described above, the telephone office OLT 610 can incorporate light source control information into an SCM frame to transmit it to one of the plurality of subscriber ONTs 630-1 to 630-N, which causes OBI, so that it can control a light source of the one subscriber ONT causing OBI.

In addition, as the optical transceiver 400 operates as described above, each of the plurality of subscriber ONTs 630-1 to 630-N can incorporate its light source information into an SCM frame to transmit it to the telephone office OLT 610.

As is apparent from the above description, the present invention provides an optical transceiver for transmitting light source control information and an optical network using the same, which are implemented so as to allow a subscriber ONT and/or a telephone office OLT to transmit light source control information by incorporating it into a Subcarrier Multiplexing frame, which is a physical layer transport frame, in an SCM optical network such as an SCM Passive Optical Network (PON) and an SCM Wavelength Division Multiplexing (WDM) PON, so that information of Optical Beat Interference (OBI) on a communication link can be transmitted in real time in the optical network such as a PON, thereby making it possible to manage and control a light source causing OBI.

That is, in the present invention, central OBI control is performed in such a manner that the OLT is responsible for OBI detection and control, and each subscriber ONT has only to provide information required by the OLT to the OLT or to operate according to control information from the OLT, thereby simplifying the operation of the subscriber modem. In addition, since control information is transmitted within a conventional data transport frame, it is possible to perform OBI control in real time without requiring an additional block for OBI detection and control. Further, since an SCM frame, which is a physical layer frame, is used to transmit control information, the control information transmission has no influence on protocols of other layers above the physical layer. Thus, the present invention can implement an optical communication system capable of effectively controlling OBI based on the telephone office OLT.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical transceiver for transmitting light source control information, the optical transceiver being applied to a telephone office OLT and a subscriber ONT in an optical network, the transceiver comprising:
    a controller for controlling transmission of light source control information used for Optical Beat Interference (OBI) control, and collecting received light source control information to perform light source control;
    an SCM frame generation/restoring unit for generating an SCM frame containing light source control information received from the controller, and restoring a received SCM frame to original data by extracting light source control information from the received SCM frame and transferring the extracted information to the controller;
    a modulator/demodulator for modulating an SCM frame generated by the SCM frame generation/restoring unit into a signal suitable for transmission, and demodulating a received signal into an SCM frame and transferring the SCM frame to the SCM frame generation/restoring unit; and
    an EO/OE converter for converting a transmission signal modulated by the modulator/demodulator into an optical signal and transmitting the optical signal through an optical fiber, and converting an optical signal received through the optical fiber into an electrical signal and transferring the electrical signal to the modulator/demodulator.

2. The optical transceiver according to claim 1, wherein the SCM frame includes:
    a preamble area containing start information of the SCM frame;
    an SCM frame header area containing an indication of whether or not OBI information is present, length information of the OBI information, and SCM frame generation information of data; and
    a light source control information area containing light source control information.

3. The optical transceiver according to claim 1, wherein the SCM frame includes:
    a preamble area containing start information of the SCM frame;
    at least one SCM frame header area containing an indication of whether or not OBI information is present, length information of the OBI information, and SCM frame generation information of data;
    a light source control information area containing light source control information;
    at least one data area containing user data; and
    a null area in which zeros are inserted to adjust the length of the SCM frame.

4. An optical network having the optical transceiver according to any one of claims 1, 2, or 3.

5. The optical transceiver according to claim 2 or 3, wherein the light source control information area includes a plurality of bytes containing light source control information, and a first byte of the plurality of bytes contains light source information and control information, the control information including ONT source/destination information of the light source information.

6. The optical transceiver according to claim 5, wherein the light source information of the light source control information area includes telephone office light source control information to be transmitted from the telephone office OLT to a subscriber ONT, the telephone office light source control information being used to control a light source of the subscriber ONT.

7. The optical transceiver according to claim 5, wherein the light source information of the light source control information area includes subscriber light source information to be transmitted from a subscriber ONT to the telephone office OLT, the subscriber light source information including information about a light source of the subscriber ONT.

* * * * *